United States Patent
Line et al.

(10) Patent No.: US 9,315,131 B2
(45) Date of Patent: Apr. 19, 2016

(54) SUSPENSION SEAT BACK AND CUSHION SYSTEM HAVING AN INNER SUSPENSION PANEL

(71) Applicant: Ford Global Technologies, LLC, Dearborn, MI (US)

(72) Inventors: Johnathan Andrew Line, Northville, MI (US); Michael Kolich, Windsor, CA (US); Daniel Ferretti, Commerce Township, MI (US)

( * ) Notice: Subject to any disclaimer, the term of this patent is extended or adjusted under 35 U.S.C. 154(b) by 50 days.

(21) Appl. No.: 14/162,072

(22) Filed: Jan. 23, 2014

(65) Prior Publication Data

US 2015/0203010 A1 Jul. 23, 2015

(51) Int. Cl.
| | |
|---|---|
| *B60N 2/54* | (2006.01) |
| *B60N 2/50* | (2006.01) |
| *B60N 2/64* | (2006.01) |
| *B60N 2/68* | (2006.01) |
| *B60N 2/70* | (2006.01) |
| *B60N 2/72* | (2006.01) |
| *B60N 2/62* | (2006.01) |

(52) U.S. Cl.
CPC *B60N 2/54* (2013.01); *B60N 2/504* (2013.01); *B60N 2/548* (2013.01); *B60N 2/64* (2013.01); *B60N 2/686* (2013.01); *B60N 2/7094* (2013.01); *B60N 2/72* (2013.01); *B60N 2/62* (2013.01)

(58) Field of Classification Search
CPC .......... A47C 7/347; A47C 23/05; A47C 7/34; A47C 7/342; A47C 7/345; B60N 2/62; B60N 2/54; B60N 2/7094; B60N 2/504; B60N 2/64; B60N 2/686; B60N 2/728
USPC ............... 297/452.49, 452.51, 452.5, 452.22, 297/452.54, 284.11, 344.18; 267/142, 132, 267/133, 166; 5/734, 722
See application file for complete search history.

(56) References Cited

U.S. PATENT DOCUMENTS

| | | | | |
|---|---|---|---|---|
| 462,317 | A * | 11/1891 | Kenfield | A47C 23/05 5/409 |
| 714,752 | A * | 12/1902 | Shea | 267/214 |
| 958,356 | A * | 5/1910 | Bode | 297/284.3 |
| 1,724,864 | A * | 8/1929 | Wisner | 5/404 |
| 1,769,434 | A * | 7/1930 | Minors | 248/580 |
| 1,804,722 | A * | 5/1931 | Van Hove | 297/452.5 |
| 2,384,713 | A * | 9/1945 | Varma | 297/452.26 |
| 2,742,957 | A * | 4/1956 | Young | 297/452.42 |
| 2,781,083 | A * | 2/1957 | Agrillo | 267/90 |
| 3,795,019 | A * | 3/1974 | Fragas | A47C 27/001 5/486 |
| 4,437,702 | A * | 3/1984 | Agosta | 297/284.8 |
| 4,893,365 | A * | 1/1990 | Justice | A47C 27/001 5/613 |
| 8,245,340 | B2 * | 8/2012 | Hsu | 5/697 |

* cited by examiner

*Primary Examiner* — Milton Nelson, Jr.
(74) *Attorney, Agent, or Firm* — Vichit Chea; Price Heneveld LLP

(57) ABSTRACT

A vehicle seating assembly includes a frame and an inner suspension panel coupled to the frame. A plurality of suspension members attach the frame to the inner suspension panel. Each suspension member has a tab that is biased away from the inner suspension panel and is operable between extended and compressed positions. A cushion is coupled to at least one of the tabs. The cushion includes a plurality of comfort positions defined by the position of each of the tabs.

13 Claims, 11 Drawing Sheets

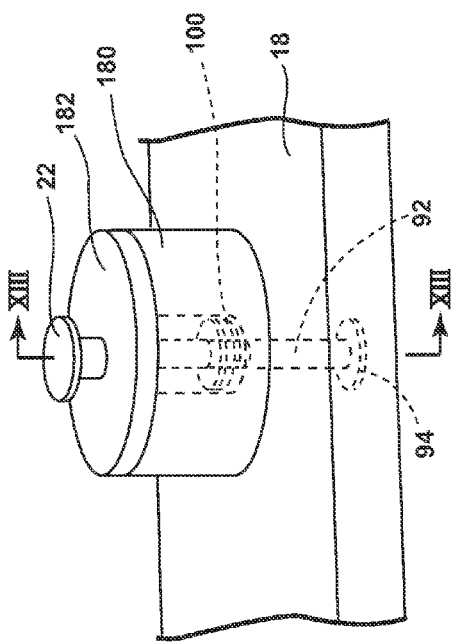
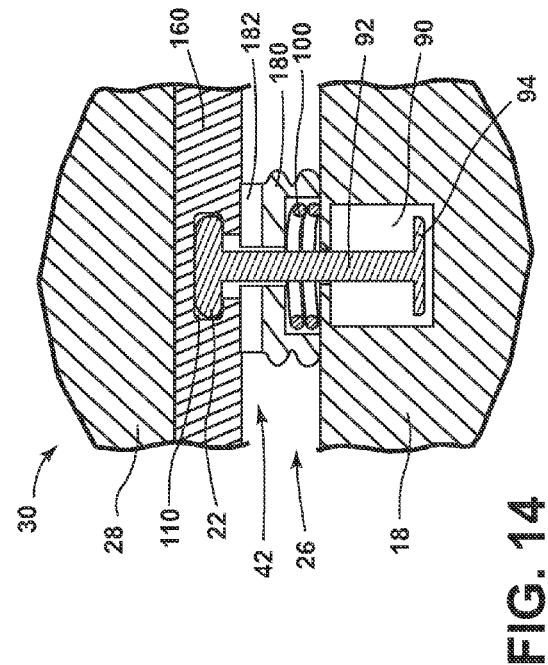
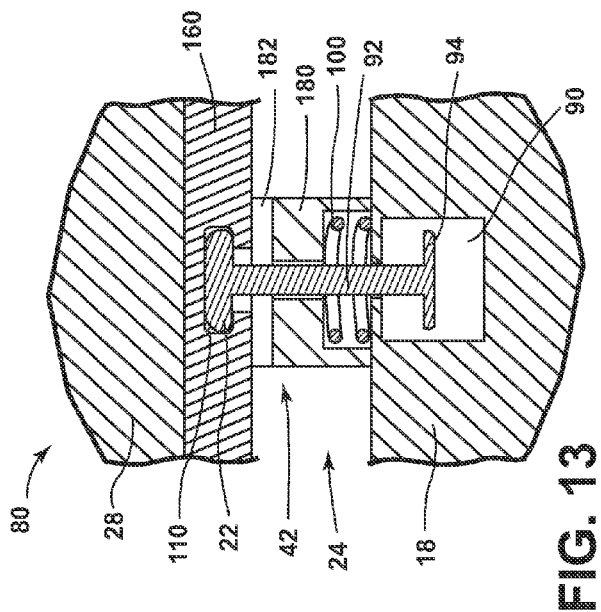

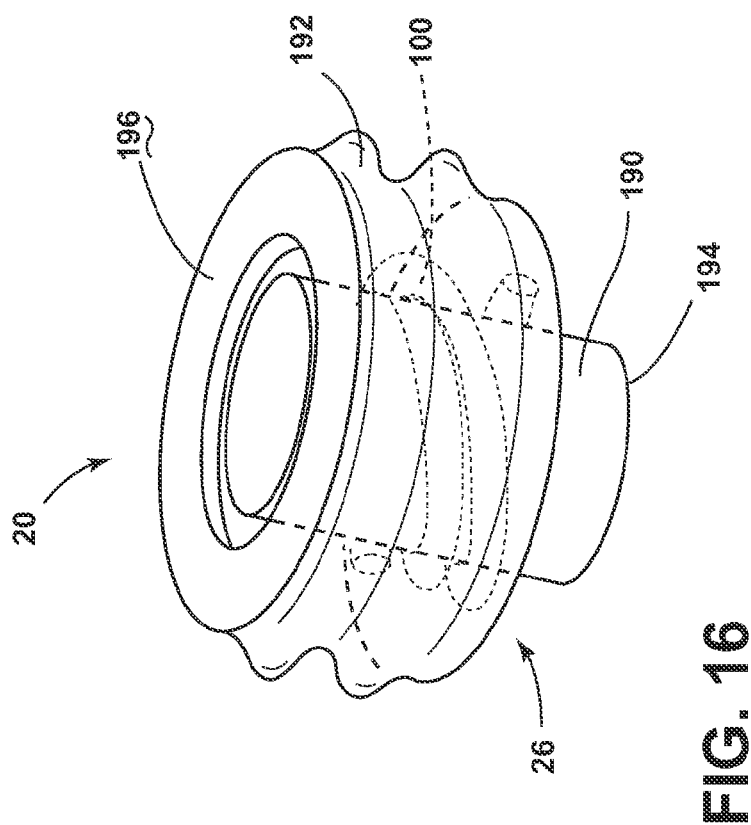
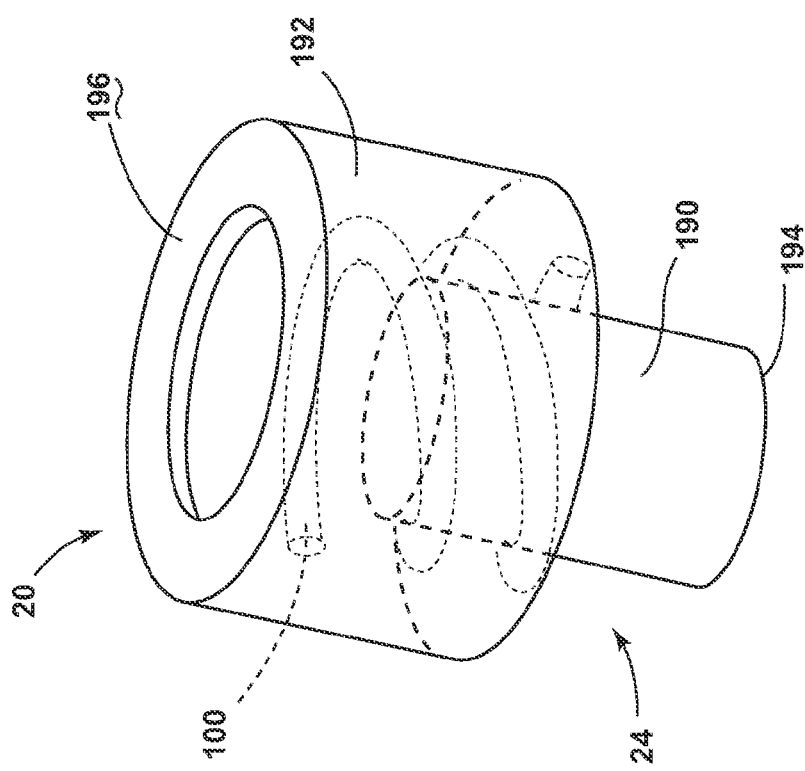

SUSPENSION SEAT BACK AND CUSHION SYSTEM HAVING AN INNER SUSPENSION PANEL

FIELD OF THE INVENTION

The present invention generally relates to vehicle seating suspension systems, and more specifically, a vehicle seating suspension system having an inner suspension panel disposed within the vehicle seat.

BACKGROUND OF THE INVENTION

The suspension system for vehicle seating typically includes foam cushions and/or an inner spring system that attaches the seating assembly frame to the seating assembly cushion. Typically, the spring system for the seating assembly extends under the entire seat and behind the entire seatback. In this manner, the seat and seatback remain relatively stable and substantially fixed relative to the vehicle seating assembly.

SUMMARY OF THE INVENTION

In at least one aspect, a vehicle seating assembly includes a frame, an inner suspension panel coupled to the frame and a plurality of suspension members. Each suspension member has a tab that is biased away from the inner suspension panel and operable between extended and compressed positions and a cushion coupled to at least a portion of the tabs. The cushion includes a plurality of comfort positions defined by the position of each of the tabs.

In at least another aspect, a vehicle seating assembly includes a plurality of outwardly biased suspension members each extending substantially perpendicular from an inner panel. Each suspension member is operable between extended and compressed positions and has a tab end distal from the inner panel. A cushion member is engaged with at least one tab end and operable between a comfort position defined by at least one suspension member being moved to the compressed position, and a rest position.

In at least another aspect, a vehicle seating assembly includes a frame and an inner panel having a perimetrical frame and an inner aperture defined by the perimetrical frame. A plurality of suspension members are disposed proximate the perimetrical frame and are outwardly biased substantially perpendicular from the inner panel. A cushion member is connected to at least a portion of the plurality of suspension members. The plurality of suspension members bias the cushion member away from the frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12 is a detail perspective view of an alternate suspension member in an extended position;

FIG. 13 is a detail cross-sectional view of the alternate suspension member of FIG. 12, taken at line XIII-XIII, with the suspension member in an extended position;

FIG. 14 is a detail cross-sectional view of the alternate suspension member FIG. 13 with the suspension member in a compressed position;

FIG. 15 is a top perspective view of another alternate embodiment of a suspension member for the inner frame suspension seating with the spring member in an extended position; and FIG. 16 is a detail perspective view of the suspension member of FIG. 15 with the suspension member in a compressed position.

DETAILED DESCRIPTION OF THE PREFERRED EMBODIMENTS

Figure 1:
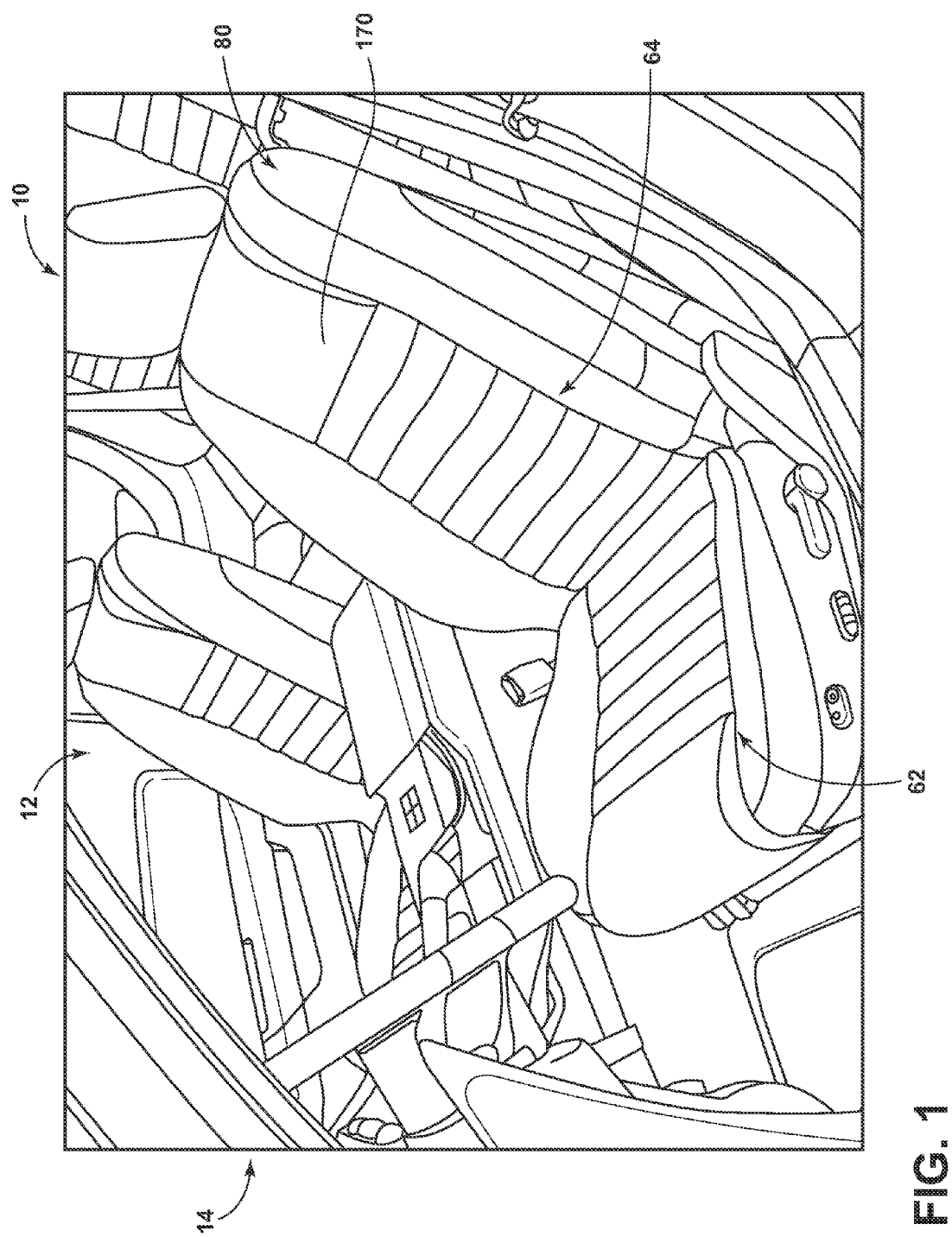
FIG. 1 is a top side perspective view of vehicle seating assembly placed within a vehicle cabin, with one embodiment of the inner frame suspension seating included within the vehicle.
Figure 2:
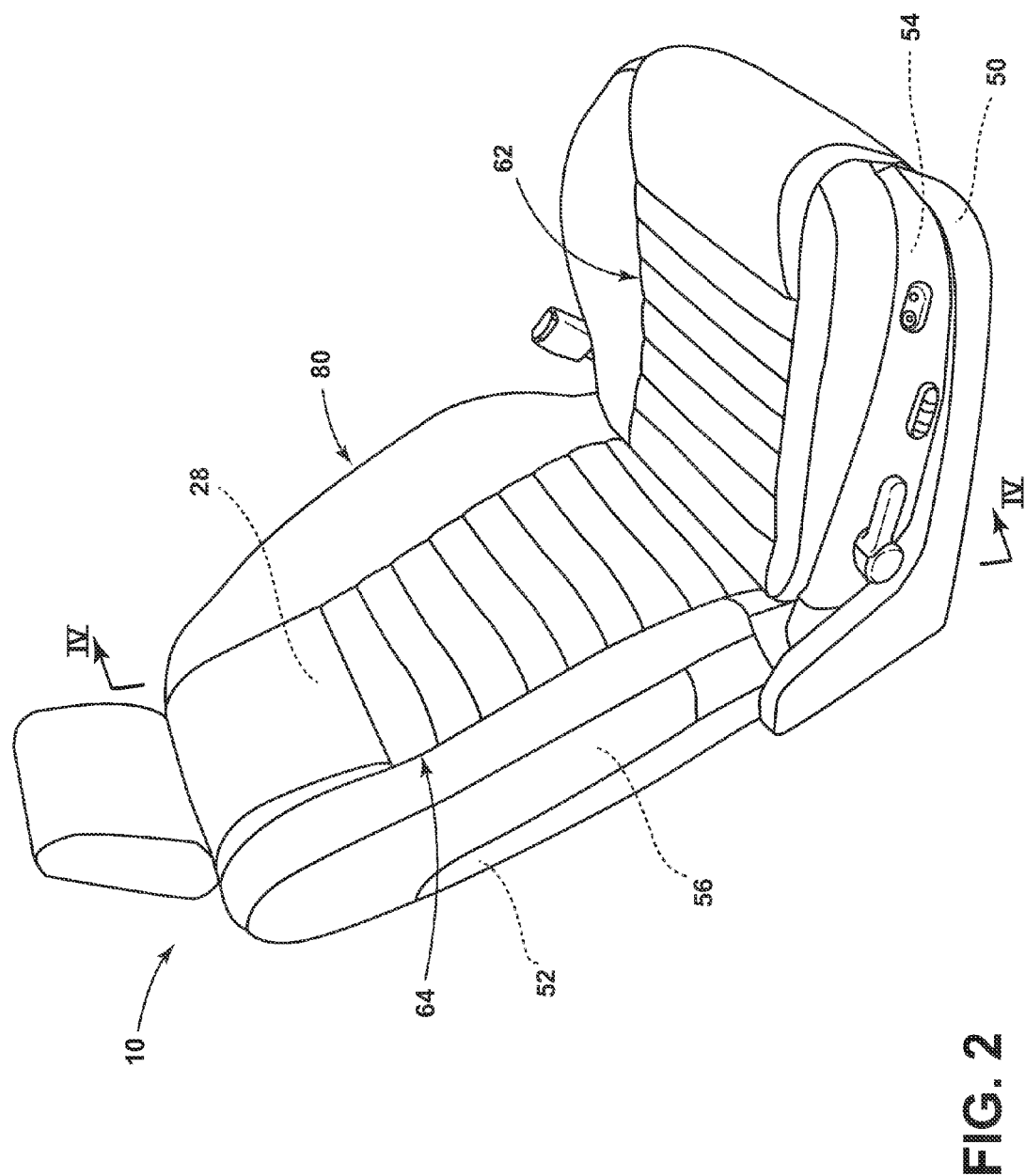
FIG. 2 is a top side perspective view of the vehicle seating assembly of FIG. 1 removed from the vehicle cabin.
Figure 3:
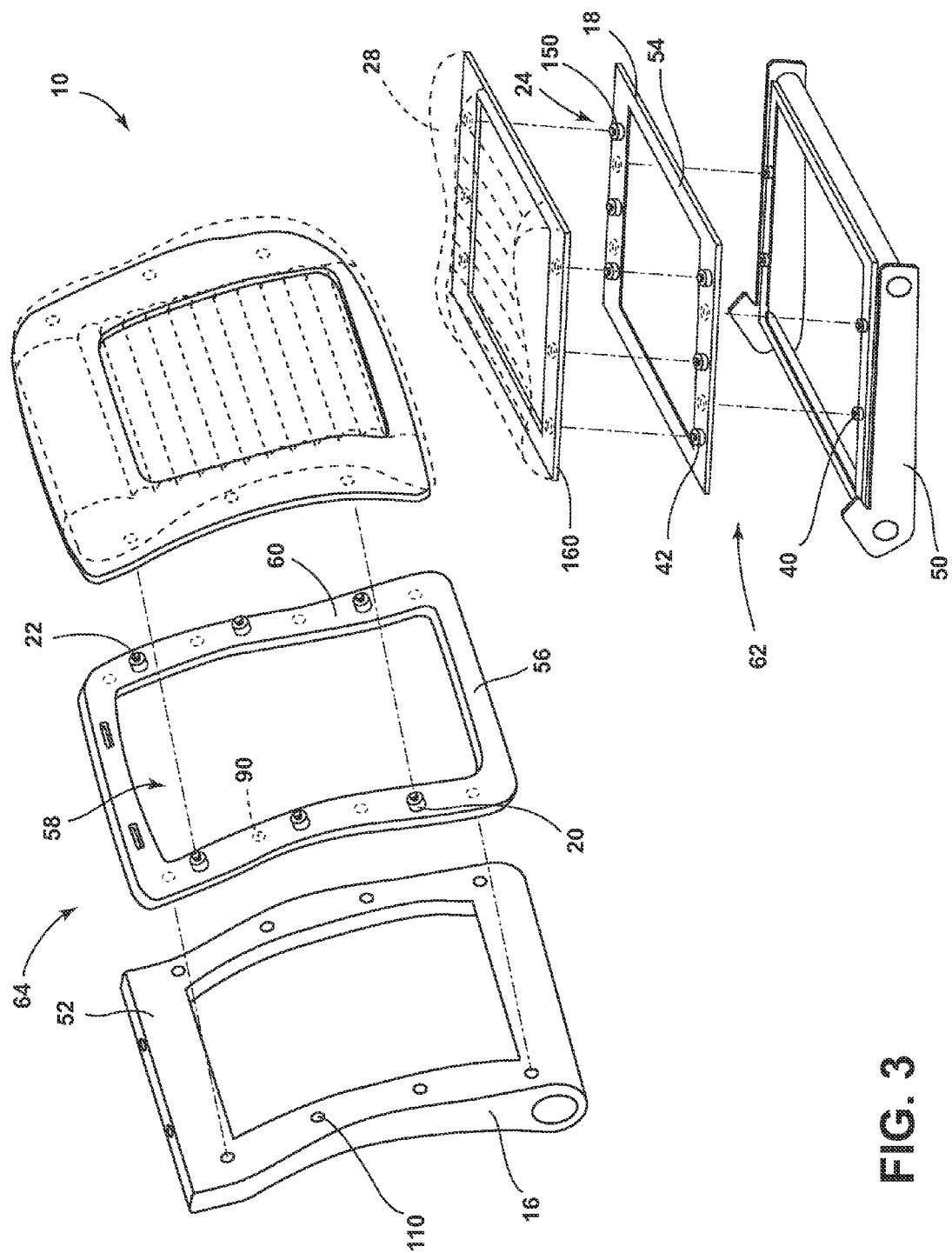
FIG. 3 is an exploded perspective view of the embodiment of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicle seating assembly 10 shown and installed within the vehicle cabin 12 of a vehicle 14, according to one embodiment. The vehicle seating assembly 10 includes a frame 16 and an inner suspension panel 18 that is coupled to the frame 16. A plurality of suspension members 20 are engaged with the inner suspension panel 18, wherein each of the suspension members 20 includes a tab 22 that is biased away from the inner suspension panel 18 and operable between the extended and compressed positions 24, 26. A cushion 28 is coupled to at least one of the tabs 22. The cushion 28 includes a plurality of comfort positions 30 defined by the position of each of the tabs 22.

Referring again to FIGS. 3 and 4, each of the plurality of suspension members 20 includes a set of frame suspension members 40 and a set of cushion suspension members 42. The tabs 22 of the frame suspension members 40 are coupled to the frame 16 and the tabs 22 of the cushion suspension members 42 are coupled to the cushion 28. In this manner, the plurality of comfort positions 30 of the cushion 28 are defined by the position of each of the frame suspension members 40 and the cushion suspension members 42.

Referring now to the embodiment of FIGS. 3-6, the frame 16 of the vehicle seating assembly 10 can include a seat frame 50 and a seatback frame 52 that are pivotally coupled wherein the seat frame 50 and the seatback frame 52 are operable relative to one another to provide the occupant of the vehicle seating assembly 10 with a variety of inclined and reclined seating positions. Each of the seat frame 50 and the seatback frame 52 can include a contoured profile to provide additional comfort to the occupant, wherein the contoured profile of the seat frame 50 and seatback frame 52 substantially matches the curvature of an individual's lower body and back, respectively. Attached to each of the seat frame 50 and seatback frame 52 is the inner suspension panel 18, wherein a seat inner suspension panel 54 is attached to the seat frame 50 and a seatback inner suspension panel 56 is attached to the seatback frame 52. Each of the seat and seatback inner suspension panels 54, 56 include a central aperture 58 defined by a perimetrical frame 60 that defines an outer edge of the central aperture 58. The frame and cushion suspension members 40, 42 are attached to each of the seat and seatback inner suspension panels 54, 56, respectively, at the perimetrical frame 60. Accordingly, each of the suspension members 20 provides support around the perimeter of the seat 62 and seatback 64 of the vehicle seating assembly 10. The suspension members 20 provide individualized support at various points around the perimetrical frame 60 of the inner suspension panel 18. Additionally, the suspension members 20 provide cushioning support at both sides of the inner suspension panel 18, such that the inner suspension panel 18 is suspended between the cushion 28 and the frame 16. In this manner, the cushion 28 is operable relative to the inner suspension panel 18, and both the cushion 28 and the inner suspension panel 18 are operable relative to the frame 16 of the vehicle seating assembly 10. The outer suspension layer 70 between the cushion 28 and the inner suspension panel 18 and the inner suspension layer 72 between the frame 16 and the inner suspension panel 18 each provide an additional layer of support, such that the vehicle seating assembly 10 can be manipulated into a variety of comfort positions 30 to accommodate the various sizes and shapes of occupants. Various seating configurations can also be achieved to accommodate a wide variety of occupants.

Figure 4:
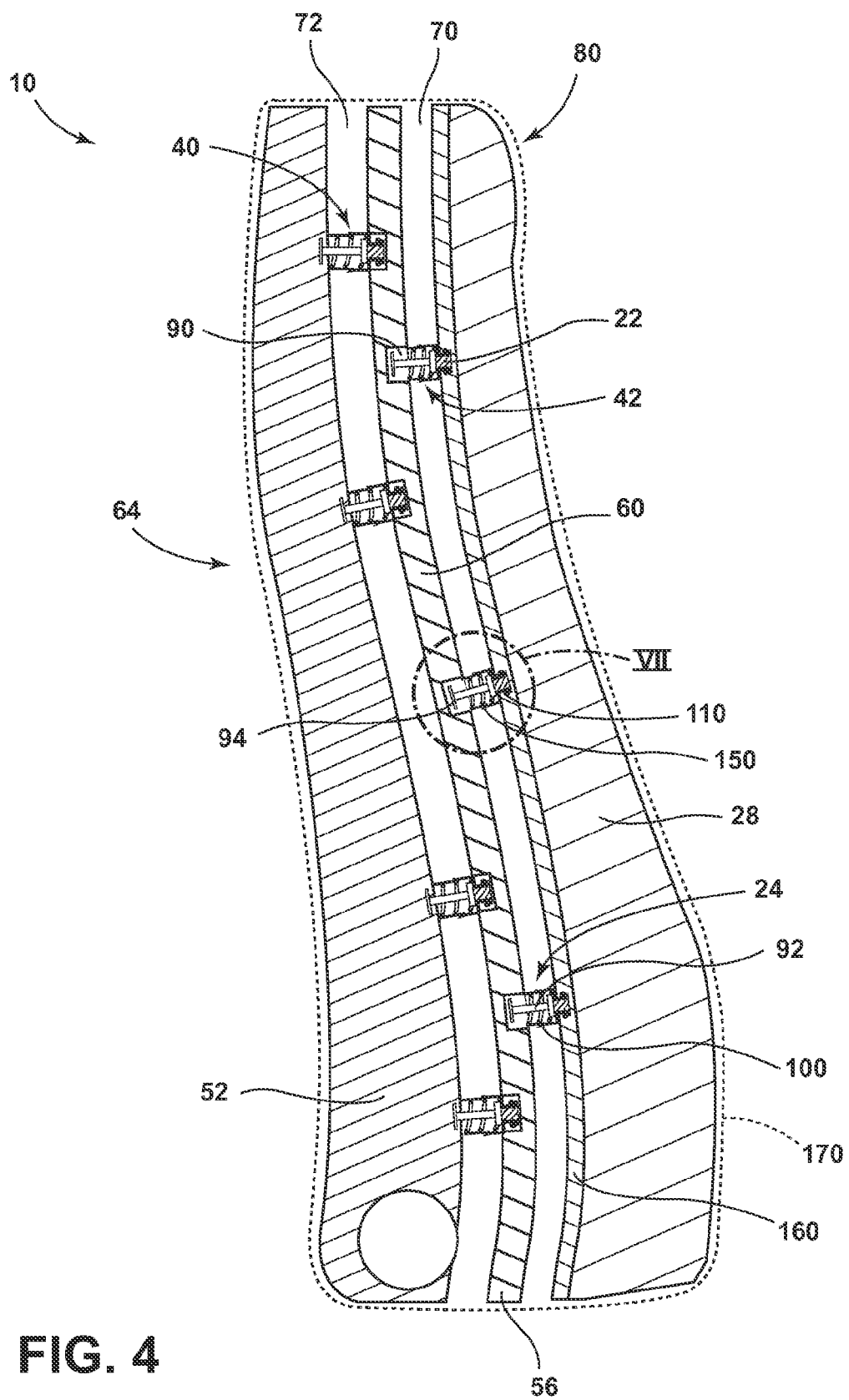
FIG. 4 is a cross-sectional view of a seatback of the vehicle seating assembly of FIG. 2, taken at line IV-IV, with the seatback in a rest position.
Figure 5:
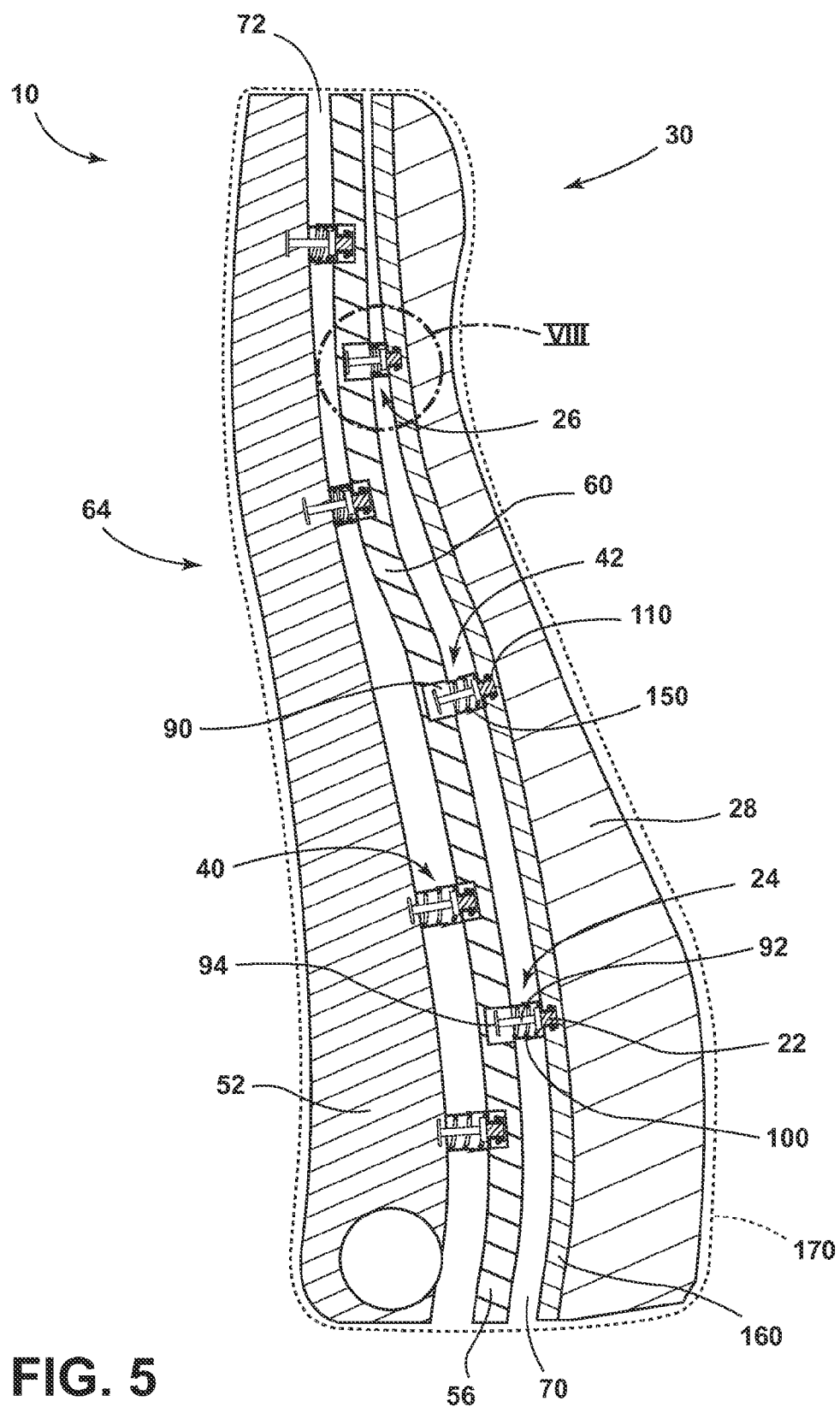
FIG. 5 is the cross-sectional view of the embodiment of FIG. 4 with the seatback in one of the comfort positions.
Figure 6:
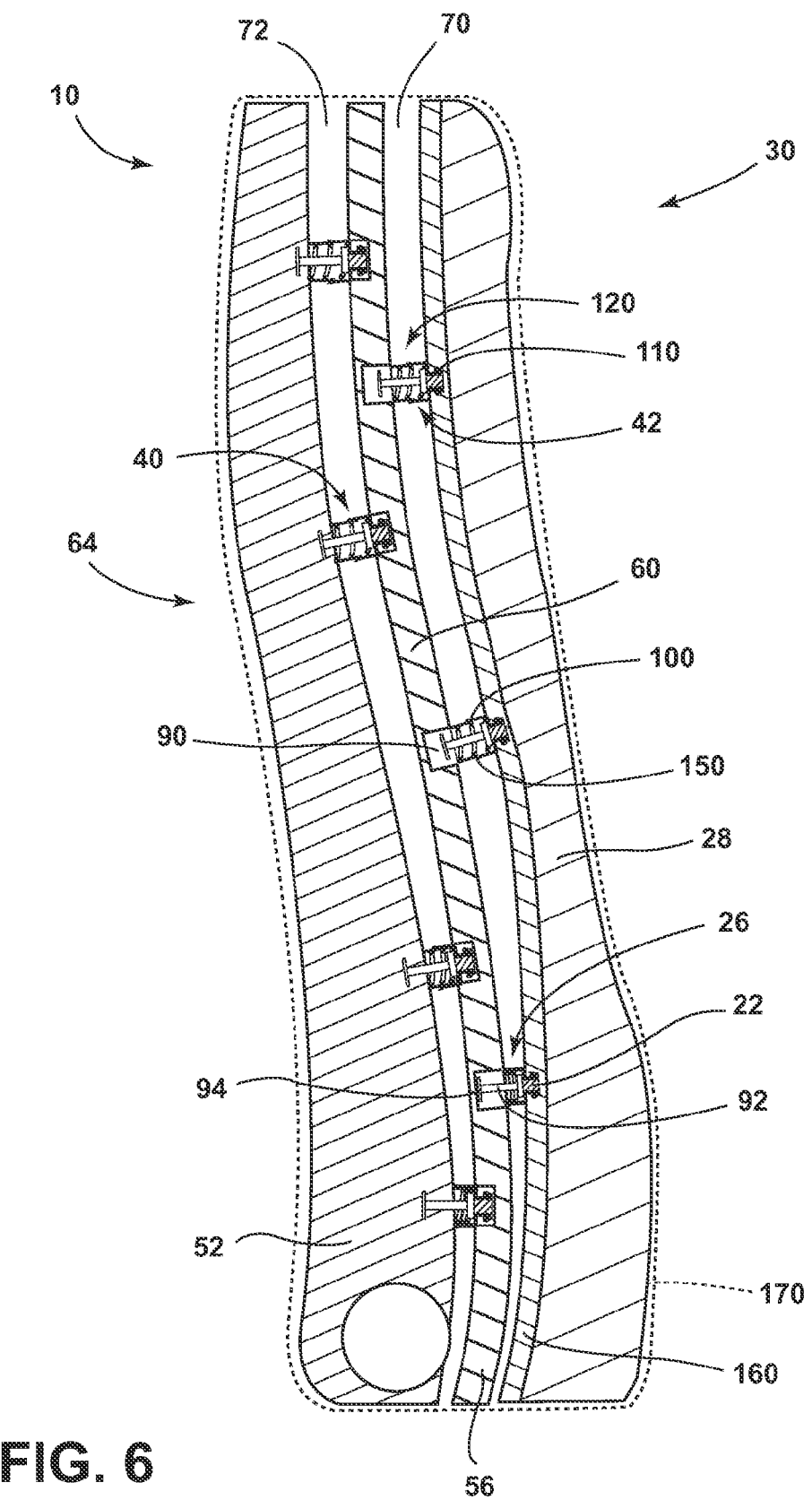
FIG. 6 is the cross-sectional view of the embodiment of FIG. 4, with the seatback in another comfort position.

As illustrated in the embodiment of FIGS. 4-6, the vehicle seating assembly 10 includes a rest position 80, wherein each of the suspension members 20 are substantially in the extended position 24. The rest position 80 typically occurs when no occupants, objects or other loads are placed upon the vehicle seating assembly 10. Alternatively, when a load is placed upon the vehicle seating assembly 10, one or more of the suspension members 20 is at least partially compressed and the vehicle seating assembly 10 is placed in one of the comfort positions 30. Each comfort position 30 is defined by the positioning of each of the suspension members 20 when at least one of the suspension members 20 is placed in one of the compressed positions 26. It is contemplated that the compressed position 26 of the suspension member 20 is defined by the suspension member 20 being at least partially compressed so as not to be in the extended position 24.

Referring now to the embodiments of FIGS. 4-8, the inner suspension panel 18 defines a plurality of attachment portions 90, wherein each of the attachment portions 90 are positioned proximate the perimetrical frame 60 of the inner suspension panel 18. In this manner, each of the suspension members 20 is coupled at a corresponding attachment portion 90 of the perimetrical frame 60 of the inner suspension panel 18. Additionally, each of the suspension members 20 includes a suspension pin 92 that extends from the attachment portion 90 of the inner suspension panel 18 to the corresponding tab 22 that is coupled to the cushion 28 of the frame 16. It is contemplated that each attachment portion 90 is defined by a recess within the inner suspension panel 18, wherein the attachment portion 90 provides space to allow the suspension member 20 to move between the extended and compressed positions 24, 26. Each suspension pin 92 includes a coupling member 94 that connects to the attachment portion 90 of the inner suspension panel 18. In this manner, the compressed position 26 of the suspension member 20 is defined by the tab 22 being positioned proximate the inner suspension panel 18 and the extended position 24 of the suspension member 20 is defined by the tab 22 being positioned distal from the inner suspension panel 18. In various embodiments, the suspension pin 92 can include first and second ends, wherein the first end includes the coupling member 94 and the second end includes the tab 22. It is contemplated that the coupling member 94 is operable within the attachment portion 90 of the inner suspension panel 18 and the tab 22 is attached to the frame/cushion 16, 28. It is contemplated that the tab 22 and coupling member 94 can also be reversed. In the various embodiments, the movement of the suspension pin 92 relative to the inner suspension panel 18, the cushion 28 and/or the frame 16 provides the suspension support for the vehicle seating assembly 10.

Referring again to FIGS. 5-8, each of the suspension members 20 can include a spring 100 disposed proximate the suspension pin 92 that is disposed between the coupling member 94 and the tab 22. It is contemplated that the spring 100 is configured to bias the tab 22 toward the extended position 24. For the cushion suspension members 42, the spring 100 is configured to bias the cushion 28 away from the inner suspension panel 18. Similarly, for the frame suspension members 40, the spring 100 is configured to bias the frame 16 away from the inner suspension panel 18. The springs 100 of the cushion suspension members 42 and the frame suspension members 40 cooperate to provide multiple levels of biasing force that suspend the cushion 28 away from the frame 16 and also suspend the inner suspension panel 18 between the cushion 28 and the frame 16.

In various embodiments, it is contemplated that the suspension pin 92 may include multiple components that operate linearly relative to one another. In such an embodiment, the spring 100 can be disposed within the suspension pin 92, wherein the spring 100 is configured to bias ends of the suspension pin 92 toward the extended position 24. Additionally, in such an embodiment, the coupling member 94 can be fixed within the attachment portion 90 and the tab 22 can be fixed within either the cushion 28 or the frame 16.

Referring again to the embodiment of FIGS. 5-8, the cushion 28 and the frame 16 can include a plurality of tab receptacles 110 that are configured to receive the tabs 22 of the cushion suspension members 42 and the frame suspension members 40, respectively. It is contemplated that the tab receptacles 110 are configured to form an interference fit with each of the tabs 22 of the suspension members 20, wherein the tabs 22 of the suspension members 20 are substantially fixed within the tab receptacles 110. The types of connection mechanisms that attach the tabs 22 within the tab receptacles 110 can include, but are not limited to, snaps, tabs, hooks, pins, and other similar interference mechanisms. In various embodiments, each of the coupling members 94 of the cushion and frame suspension members 42, 40 are configured to engage the inner suspension panel 18.

As shown in the embodiment of FIGS. 5-8, it is contemplated that the coupling members 94 can be operable within the inner suspension panel 18, wherein the coupling members 94 are slidably engaged with the attachment portions 90 of the inner suspension panel 18 to provide for movement of the suspension pin 92 of the suspension member 20. In this manner, the movement of the coupling members 94 within the attachment portions 90 allows the cushion 28 to operate relative to the inner suspension panel 18 and the inner suspension panel 18 to operate relative to the frame 16. In various alternate embodiments, it is contemplated that at least a portion of the tabs 22 of the suspension members 20 can be configured to couple to the inner suspension panel 18 and at least a portion of the coupling members 94 of the suspension members 20 can be configured to engage either the cushion 28 or the frame 16. In such an embodiment, the tab receptacles 110 can be disposed within the perimetrical frame 60 of the inner suspension panel 18 and the coupling members 94 of the suspension members 20 can be slidably engaged with one of the cushion and the frame 16 to provide for the cushioning movement of the vehicle seating assembly 10 in the various comfort positions 30 defined thereby.

As illustrated in the embodiment of FIGS. 4-8, each of the suspension members 20 is configured to be perpendicularly biased away from the inner suspension panel 18. As the occupant sits within the vehicle seating assembly 10 and the occupant's weight is disposed upon each of the suspension members 20, each of the suspension members 20 moves away from the extended position 24 and toward any one of a plurality of compressed positions 26, wherein at least a portion of the frame 16 and cushion suspension members 42 are at least partially compressed toward the inner suspension panel 18. In various embodiments, each of the suspension members 20 can be configured to move at least partially in a non-perpendicular direction, such that the cushion 28 can shift at least partially relative to the inner suspension panel 18 and the inner suspension panel 18 can shift at least partially relative to the frame 16 as the occupant sits within the vehicle seating assembly 10. In this manner, the vehicle seating assembly 10 can provide cushioning perpendicular to the inner suspension panel 18 and also can provide lateral or shifting support to the occupant. In the various embodiments, each suspension member 20 is configured to operate between the extended and compressed positions 24, 26 independent of the other suspension members 20. Accordingly, the suspension members 20 allow the cushion 28 of the vehicle seating assembly 10 to receive and support a wide range of body types and usage configurations.

In various embodiments, as illustrated in FIGS. 4-6, the comfort positions 30 of the vehicle seating assembly 10 may be defined by at least one of the suspension members 20 being disposed in a hyper-extended position 120, wherein the suspension member 20 is extended beyond the extended position 24. Where the suspension member 20 is in a hyper-extended position 120, the spring 100 can be configured to bias the suspension member 20 from the hyper-extended position 120 to the extended position 24. Accordingly, the vehicle seating assembly 10 is configured to operate in a plurality of directions to substantially account for the comfort and movement of the occupant of the vehicle seating assembly 10.

Figure 9:
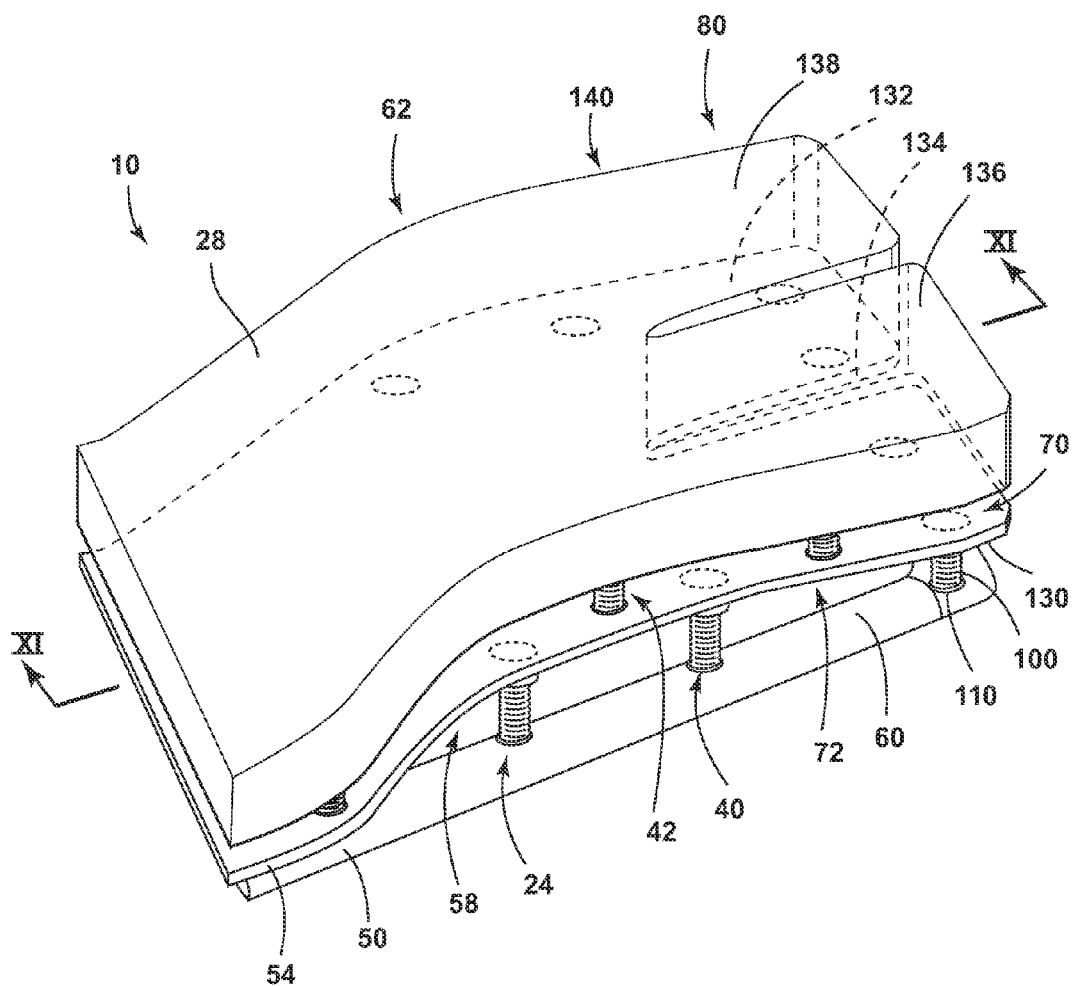
FIG. 9 is a top perspective view of an embodiment of a seat of the vehicle seating assembly.
Figure 10:
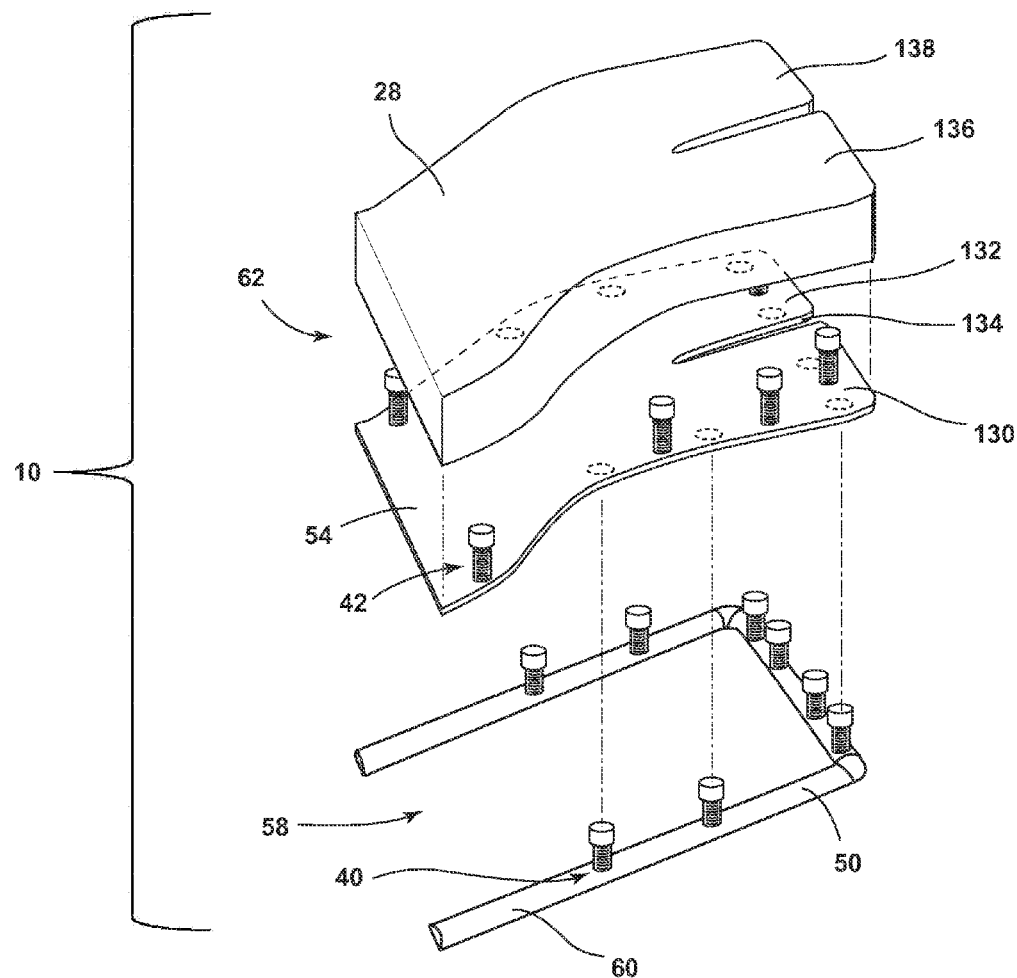
FIG. 10 is an exploded perspective view of the embodiment of FIG. 9.
Figure 11:
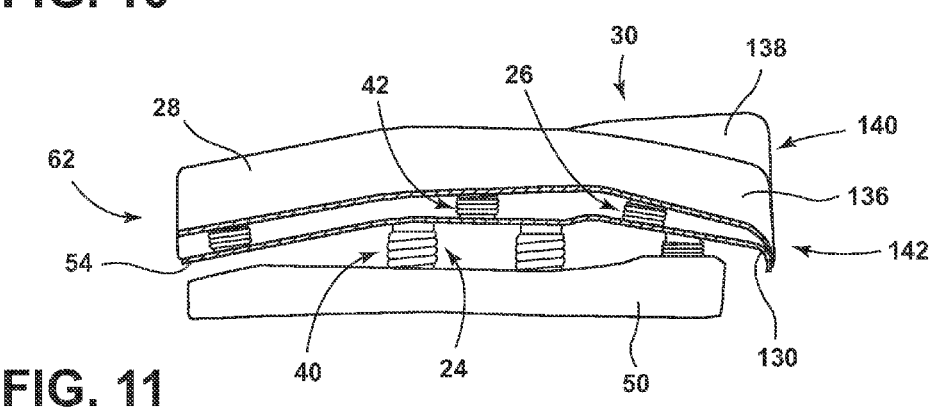
FIG. 11 is a cross-sectional view of the embodiment of FIG. 9, taken at line XI-XI, with one of the suspension members in the lowered position.

Referring now to the embodiment of FIGS. 9-11, the seat 62 of the vehicle seating assembly 10 can include a seat inner suspension panel 54 and a cushion 28 that define independently operable right and left leg supports 130, 132. In such an embodiment, the seat inner suspension panel 54 can include a dividing slot 134 between the right and left leg supports 130, 132, wherein the right and left leg supports 130, 132 are operable independently of one another to provide individualized support to each of the right and left legs of the occupant. It is contemplated that the cushion 28 of the seat 62 can also include right and left leg portions 136, 138 that are individually operable with the right and left leg supports 130, 132 of the seat inner suspension panel 54. Alternatively, it is contemplated that, in various embodiments, the cushion 28 can be free of a dividing slot 134 and the cushion 28 can be configured to twist, stretch, bend and otherwise be manipulated to accommodate the independent movements of the right and left leg supports 130, 132 of the seat inner suspension panel 54 to allow for the movement of the occupant's right and left legs relative to the seat 62. In the various embodiments, the attachment of the seat inner suspension panel 54 at the right and left leg supports 130, 132 is substantially similar to that described above, wherein cushion suspension members 42 couple the cushion 28 to the inner suspension panel 18 and frame suspension members 40 couple the seat inner suspension panel 54 to the frame 16 of the seat 62.

Referring again to the embodiment of FIGS. 9-11, as the occupant uses the vehicle seating assembly 10 having the right and left leg supports 130, 132, the occupant's leg movements, and in particular the driver's leg movements, are received and accommodated by the right and left leg supports 130, 132. By way of explanation, and not limitation, where the driver's seat includes the right and left leg supports 130, 132, as the driver uses the gas pedal, brake pedal, clutch, or other foot controls, the right and left leg supports 130, 132 of the seat 62 and the suspension members 20 disposed therein provide individualized support to each of the occupant's legs as the driver's legs move during operation of the vehicle 14. Accordingly, the comfort position 30 provided by the vehicle seating assembly 10 continually changes along with the movements of the driver during operation of the vehicle 14. During the operation of the vehicle 14, each of the right and left leg supports 130, 132 is individually operable between an upper position and a lower position 140, 142, to accommodate the movement of the occupant's legs while driving the vehicle 14 or while sitting within one of the passenger seats of the vehicle 14.

Figure 7:
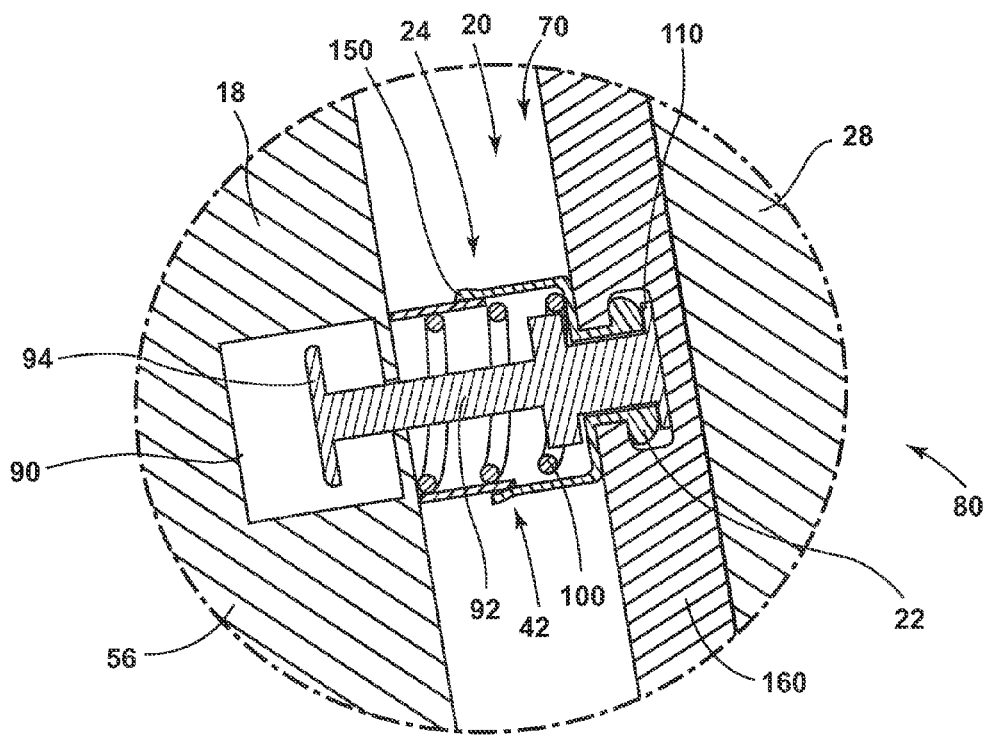
FIG. 7 is a detail cross-sectional view of the embodiment of FIG. 4, taken at area VII with the suspension member in an extended position.
Figure 8:
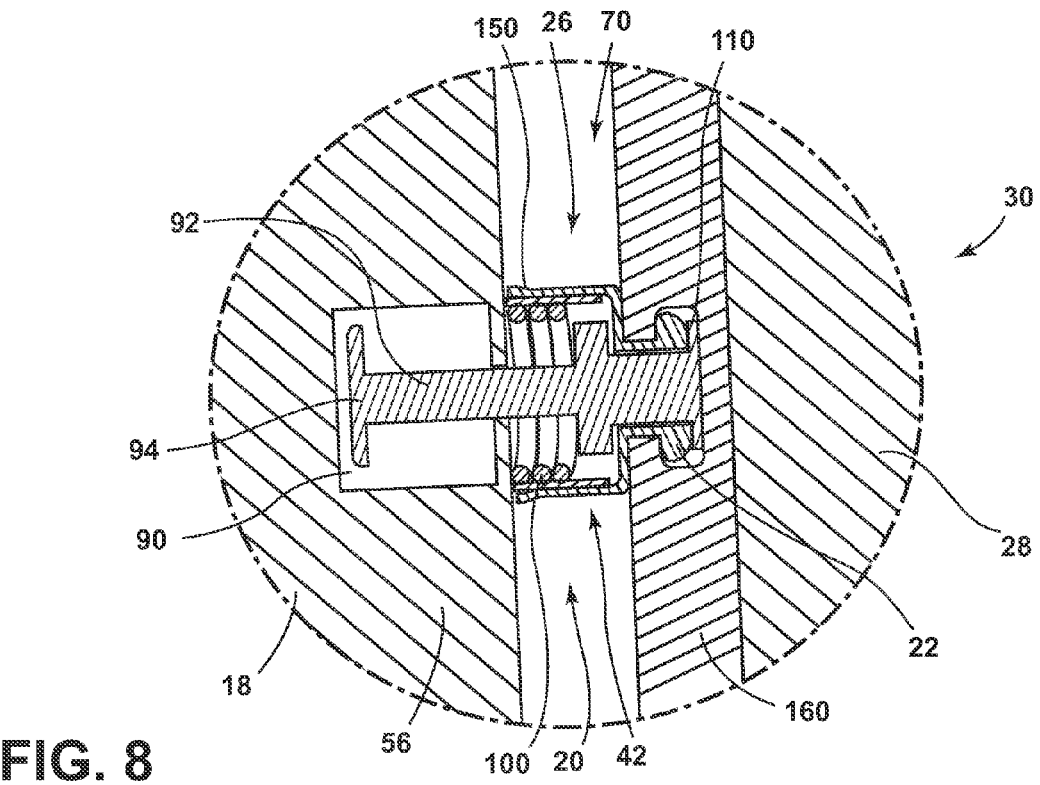
FIG. 8 is a detail cross-sectional view of the embodiment of FIG. 5 taken at area VIII with the suspension member in a compressed position.

Referring again to the embodiment of FIGS. 7 and 8, in various embodiments, each of the suspension members 20 can include a flexible gasket 150 that surrounds the suspension pin 92 and the spring 100 to prevent dust, dirt and debris from interfering with the operation of the suspension member 20. The flexible gasket 150 can include a single flexible member 192 or can include a plurality of members that are configured to slidably engage one another as the suspension member 20 operates between the compressed and extended positions 26, 24.

In various embodiments, as illustrated in FIGS. 3-11, the frame 16 of the vehicle seating assembly 10 can be made of one or more of a plurality of materials that can include, but are not limited to, metal, plastic, composite, combinations thereof, and other substantially rigid materials that are configured to be securely coupled to the frame 16 of the vehicle 14 and also configured to receive the frame suspension members 40 of the vehicle seating assembly 10. The inner suspension panels 18 of the vehicle seating assembly 10 is configured to be made of materials that include, but are not limited to, metal, plastic, composite, wood, combinations thereof, and other substantially rigid materials that are configured to receive the cushion and frame suspension members 42, 40. It is contemplated that in various embodiments, at least one of the frame 16 and the inner suspension panels 18 can be configured to flex, bend, or have at least some limited elastic movement to provide additional layers of comfort to the occupant during operation of the vehicle 14. In the various embodiments, the cushion 28 of the vehicle seating assembly 10 can include a substantially rigid backing member 160 that defines the tab receptacles 110 and/or the attachment portions 90 that are configured to receive the tabs 22 and/or coupling members 94, respectively, of the cushion suspension members 42. This backing member 160 of the cushion 28 can be made of various materials that can include, but are not limited to, plastic, wood, metal, and other substantially rigid materials. Similar to the inner suspension panels 18 and frame 16, the cushion backing can be configured to include some limited flexible movement to provide additional comfort to the occupant of the vehicle 14. The cushion 28, in the various embodiments, can also include one or more cushioning materials that can include, but are not limited to, polyurethane foam, memory foam, cotton, other synthetic cushioning materials, other natural cushioning materials, combinations thereof, and other similar cushioning materials.

In the embodiments illustrated in FIGS. 4-6, the vehicle seating assembly 10 can include a cover member 170 that extends over the cushion 28, the inner suspension panel 18, and at least a portion of the frame 16 of the seat 62 and the seatback 64, wherein the cover member 170 can be made of various materials that can include, but are not limited to, vinyl, leather, plastic, cotton, and other substantially flexible and at least partially elastic materials that are configured to cover the vehicle seating assembly 10. It is contemplated that the cover member 170 is at least partially flexible and/or elastic to account for the movement of the cushion 28 and the inner suspension panel 18 between the rest position 80 and the plurality of comfort positions 30.

As illustrated in the embodiments of FIGS. 1-11, the vehicle seating assembly 10 described above can be installed in a variety of seating positions, within the vehicle cabin 12. These positions include, but are not limited to, driver's seat, passenger seat, rear seat, or other seating location. It is also contemplated that the vehicle seating assembly 10 described above can also be disposed within a wide variety of vehicles, such as SUVs, CUVs, four-door vehicles, two-door vehicles, pick-up trucks, and others.

Referring now to the embodiments illustrated in FIGS. 12-16, the cushion and frame suspension members 42, 40 can include foam or rubberized biasing members 180 that are configured to provide the biasing force for the suspension members 20. The foam or rubberized biasing member 180 can be included instead of, or in addition to, the spring 100, wherein the foam or rubberized biasing member 180 is configured to position the suspension member 20 between the extended and compressed positions 24, 26. Various suspension members 20 can also include a base plate 182 proximate the tab 22 of the suspension member 20 that is configured to compress the spring and/or biasing member 100, 180 into the compressed position 26 as the occupant exerts force against the vehicle seating assembly 10. In various alternate embodiments, the suspension members 20 can include a post 190 coupled with a flexible member 192, wherein the flexible member 192 can include a spring 100 and/or a flexible gasket 100, 150. In such an embodiment, a connection end 194 of the post 190 is coupled to the inner suspension panel 18 and an attachment surface 196 of the flexible gasket 150 is attached to either the cushion 28 or the frame 16, depending upon whether the suspension member 20 is a cushion suspension member 42 or frame suspension member 40. It is contemplated that in various embodiments, the connection end 194 of the post 190 can be attached to either the frame 16 or the cushion 28 and the attachment surface 196 of the flexible gasket 150 can be attached to the inner suspension panel 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
   a frame;
   an inner suspension panel coupled to the frame and including a plurality of suspension members, each suspension member having a tab that is biased away from the inner suspension panel and operable between extended and compressed positions; and a cushion coupled to at least a portion of the tabs, wherein the cushion includes a plurality of comfort positions defined by the position of each of the tabs, wherein the plurality of suspension members include frame suspension members and cushion suspension members, wherein the tabs of the frame suspension members are coupled to the frame and the tabs of the cushion suspension members are coupled to the cushion, and wherein the plurality of comfort positions are defined by the position of each of the frame suspension members and cushion suspension members, and wherein the cushion includes a plurality of tab receptacles, wherein each of the tab receptacles receives a corresponding tab of at least one of the cushion suspension members.

2. The vehicle seating assembly of claim 1, further comprising:

a plurality of attachment members that attach the frame to the inner suspension panel, wherein the plurality of attachment members are disposed proximate a perimetrical frame of the inner suspension panel.

3. The vehicle seating assembly of claim 1, wherein the inner suspension panel defines a central aperture and a perimetrical frame defining an outer edge of the central aperture, wherein the frame suspension members and cushion suspension members are attached to the inner suspension panel at the perimetrical frame.

4. The vehicle seating assembly of claim 3, further comprising:

a seat, wherein the inner suspension panel and the cushion define independently operable right and left leg supports of the seat.

5. The vehicle seating assembly of claim 1, wherein each of the plurality of suspension members includes a suspension pin that extends from the inner suspension panel to a corresponding tab, wherein each suspension pin includes a coupling member that connects each of the plurality of suspension members to the inner suspension panel, wherein the compressed position is defined by the tab being positioned proximate the inner suspension panel, and wherein the extended position is defined by the tab being positioned distal from the inner suspension panel.

6. The vehicle seating assembly of claim 5, wherein each suspension member includes a spring disposed proximate the suspension pin between the coupling member and the tab, wherein the spring biases the coupling member toward the extended position.

7. The vehicle seating assembly of claim 6, wherein each suspension member includes a flexible gasket positioned proximate the spring between the coupling member and the tab.

8. A vehicle seating assembly comprising:

a plurality of outwardly biased suspension members each extending substantially perpendicular from an inner panel, each suspension member being operable between extended and compressed positions and having a tab end distal from the inner panel;

a cushion engaged with at least one tab end and operable between a comfort position, defined by at least one suspension member being moved to the compressed position, and a rest position, wherein the rest position of the cushion is defined by the tab ends being fully biased away from the inner panel in the extended position, and wherein the compressed position is defined by at least one tab end being distal from the extended position, and wherein the inner panel defines a central aperture and a perimetrical frame defining an outer edge of the central aperture, wherein the plurality of suspension members are attached to the inner panel at the perimetrical frame; and a seat, wherein the cushion disposed on the seat includes independently operable right and left leg supports, wherein each of the right and left leg supports are biased away from the perimetrical frame by at least one suspension member.

9. The vehicle seating assembly of claim 8, further comprising:

a plurality of attachment members that attach the inner panel to a frame, wherein the plurality of attachment members are disposed proximate the perimetrical frame.

10. The vehicle seating assembly of claim 8, further wherein each suspension member includes a suspension pin that includes a coupling member that engages the perimetrical frame, wherein the suspension pin slidably engages the inner frame to define the extended and compressed positions of the suspension members.

11. The vehicle seating assembly of claim 10, wherein each suspension member includes a spring disposed proximate the suspension pin between the coupling member and the tab end of the respective suspension pin, wherein the spring biases the suspension member toward the extended position.

12. The vehicle seating assembly of claim 11, wherein the cushion includes a plurality of receptacles that each receive at least one corresponding tab end of the plurality of suspension members.

13. The vehicle seating assembly of claim 11, wherein each suspension member includes a flexible gasket positioned proximate the spring.

* * * * *